(12) United States Patent
Baba et al.

(10) Patent No.: US 6,362,807 B1
(45) Date of Patent: Mar. 26, 2002

(54) IMAGE FORMING SHEET, OPERATING APPARATUS, IMAGE FORMING APPARATUS WITHOUT TRANSPARENT ELECTRODE, AND IMAGE FORMING METHOD

(75) Inventors: Tomo Baba; Daisuke Tsuda, both of Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/321,758

(22) Filed: May 28, 1999

(30) Foreign Application Priority Data

Jul. 23, 1998 (JP) ............................................. 10-207538
May 7, 1999 (JP) ............................................ 11-127180

(51) Int. Cl.$^7$ ................................................ G09G 3/34
(52) U.S. Cl. ........................ 345/107; 359/293; 359/296
(58) Field of Search ........................... 345/107; 359/293, 359/296

(56) References Cited

U.S. PATENT DOCUMENTS 4,143,103 A    3/1979   Sheridon
5,724,064 A  * 3/1998   Stefik et al. ................. 345/105
5,956,005 A  * 9/1999   Sheridon ....................... 345/84
6,045,955 A  * 4/2000   Vincent ......................... 430/45
6,118,426 A  * 9/2000   Albert et al. ................ 345/107
6,222,513 B1 * 4/2001   Howard et al. ................ 345/84

FOREIGN PATENT DOCUMENTS

JP    A 2-254420    10/1990
JP    A 4-355786    12/1992
JP    A 6-35370      2/1994

* cited by examiner

Primary Examiner—Almis R. Jankus
Assistant Examiner—Henry N. Tran
(74) Attorney, Agent, or Firm—Oliff & Berridge, PLC

(57) ABSTRACT

An image forming sheet is constituted by a sheet-shaped image forming layer for forming thereon a visible image by being applied by any one of an electric field and a magnetic field, and a pair of flexible films for supporting the image forming layer from both surface sides thereof without having an electrode, one of an electric resistance and a magnetic resistance of one flexible file is smaller than that of the other flexible film. As a result, the image formed on this image forming sheet can be confirmed without using a transparent electrode.

28 Claims, 15 Drawing Sheets

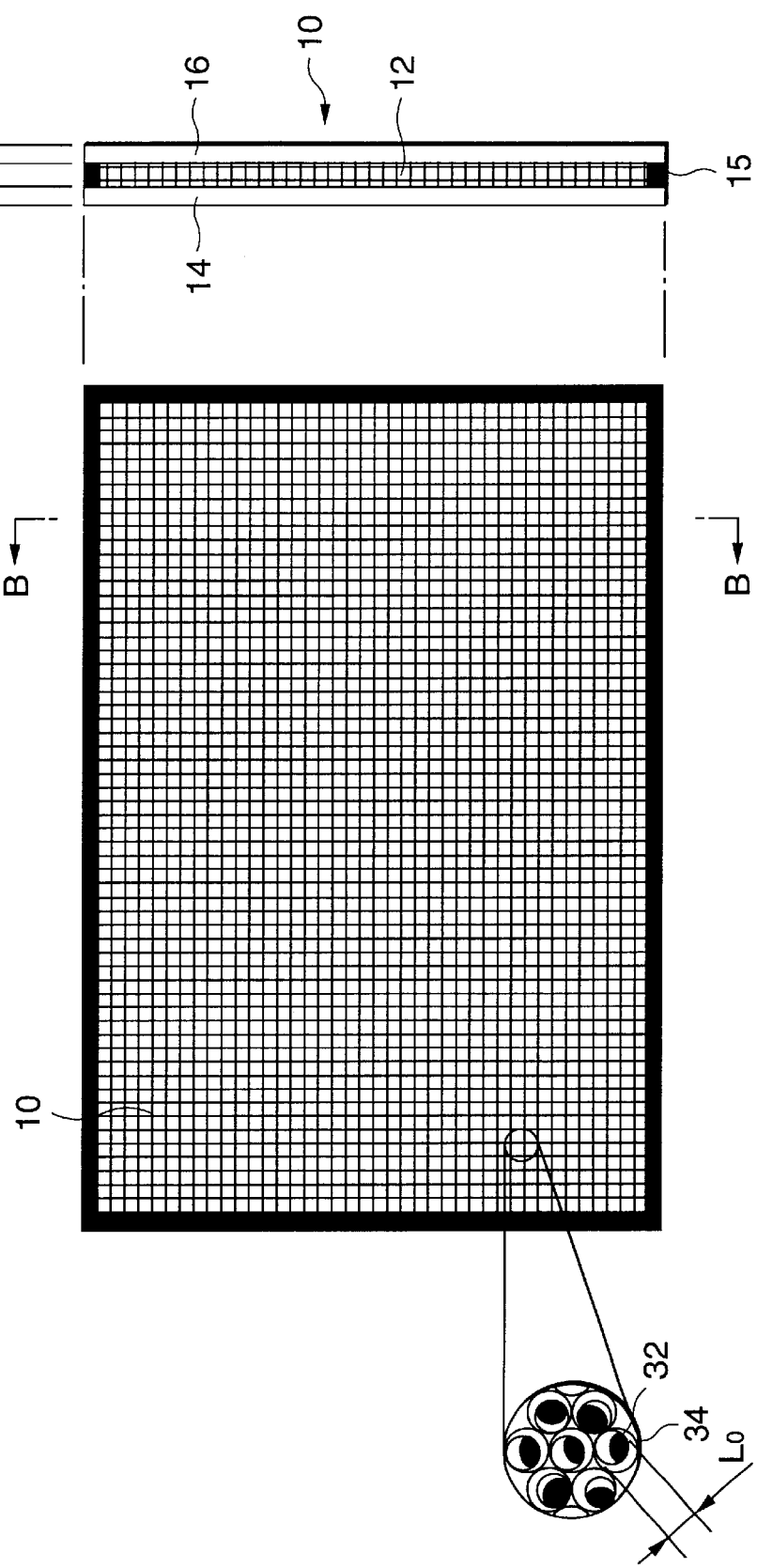

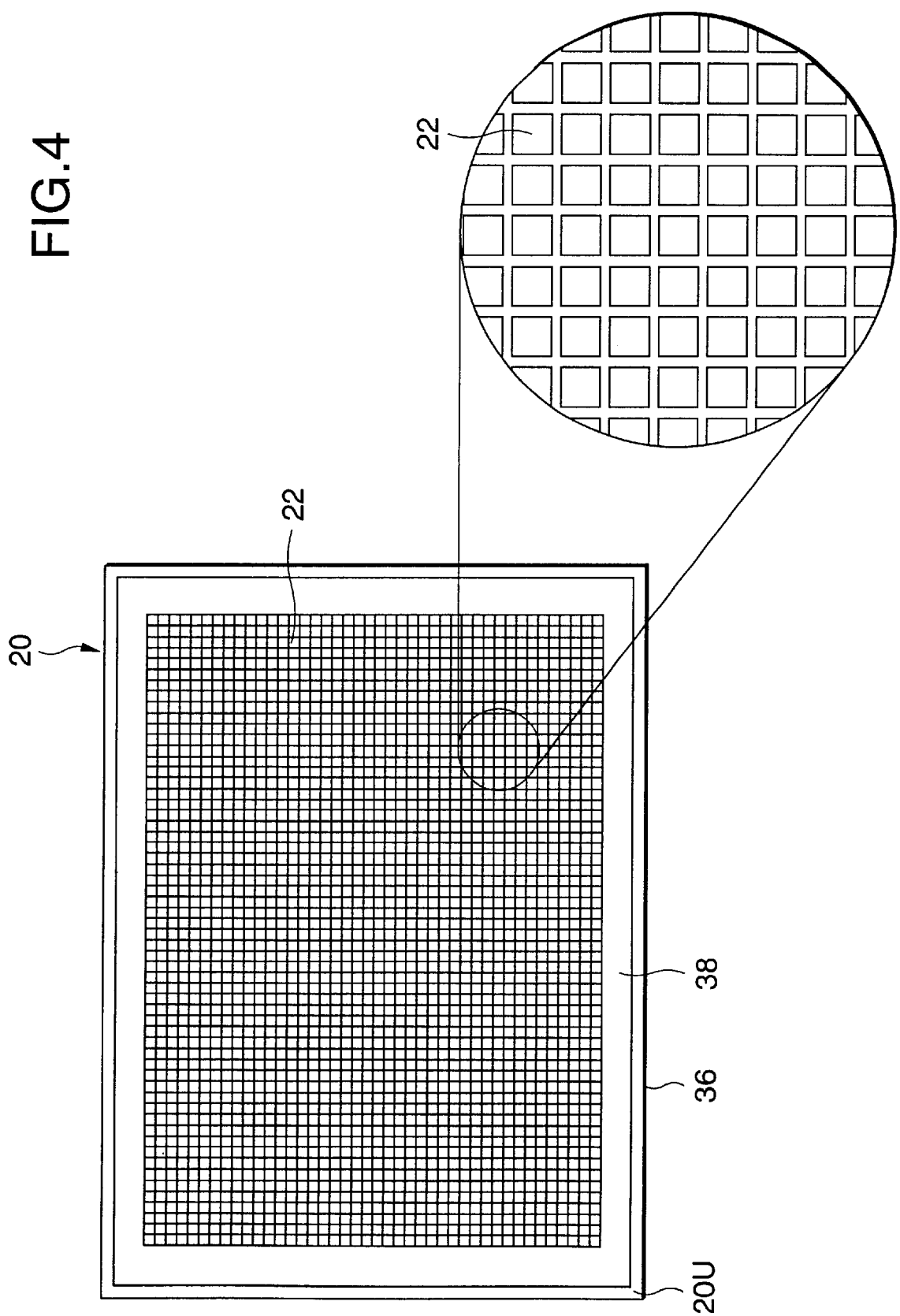

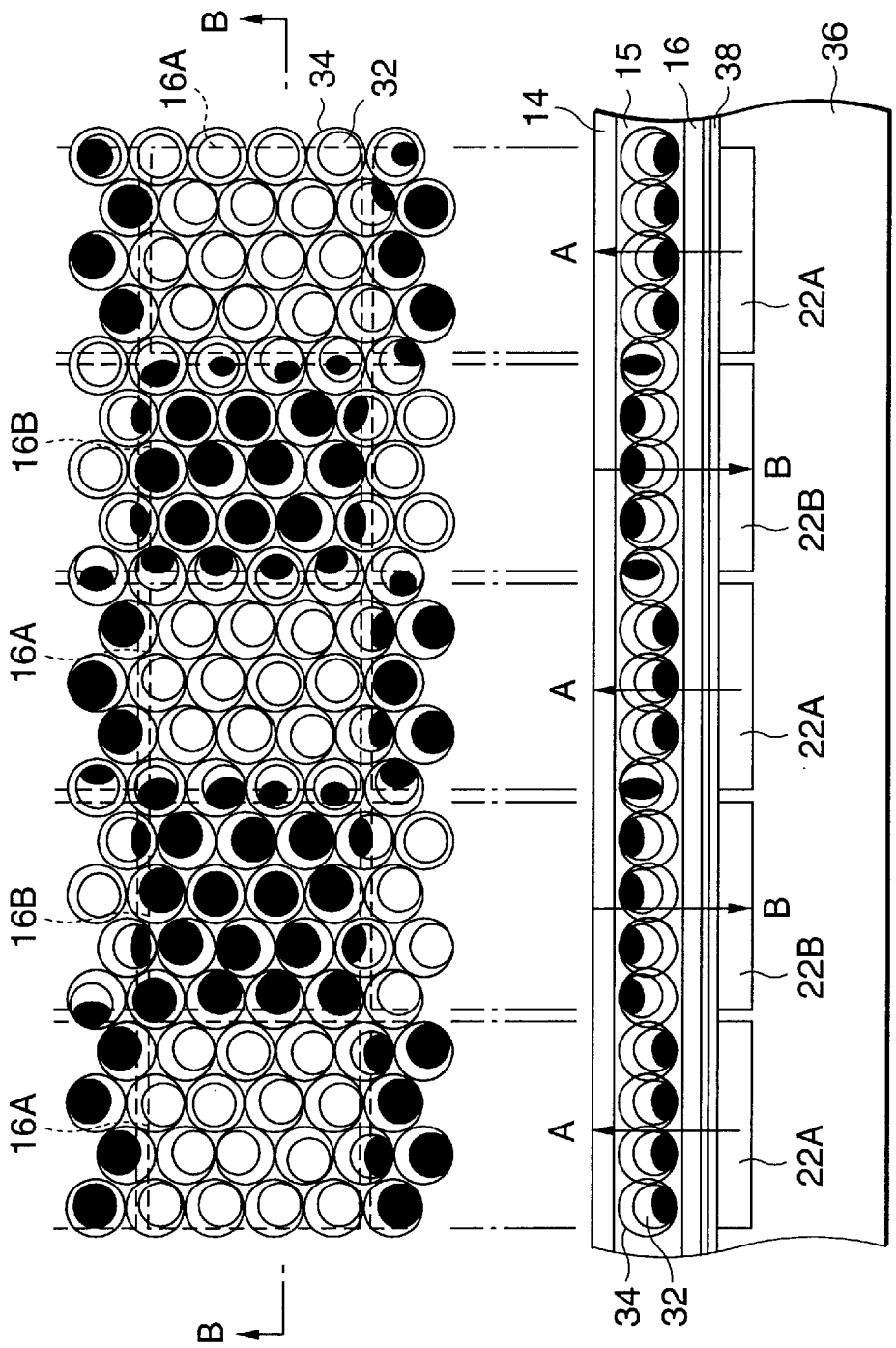

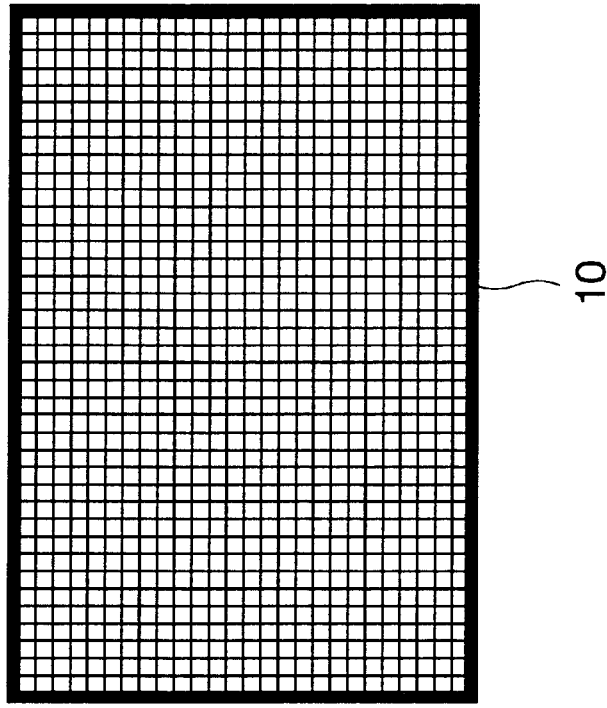
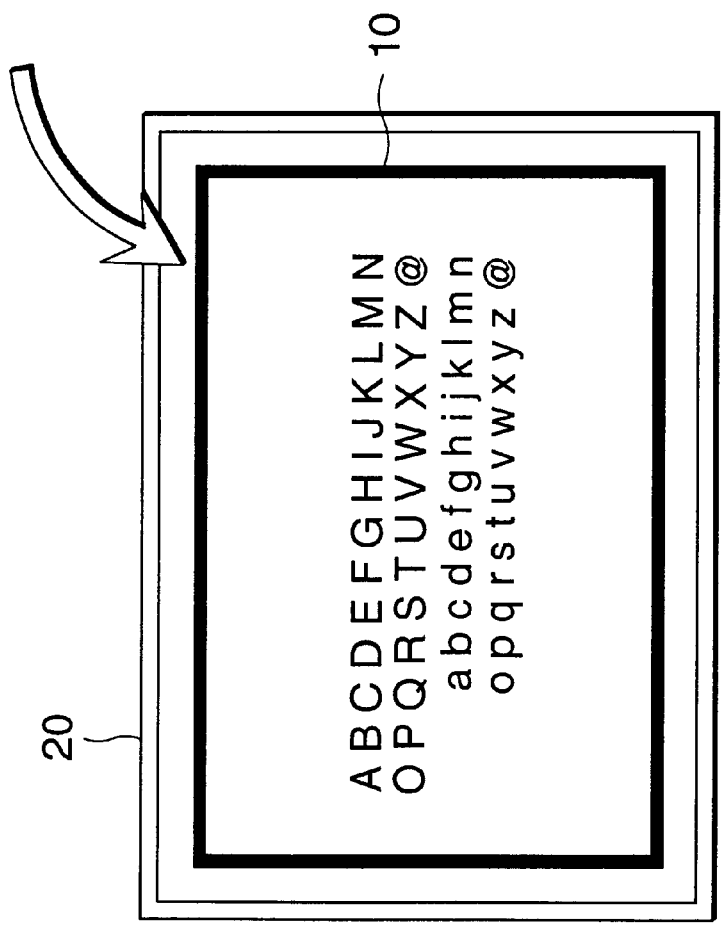
FIG.6(A)
FIG.6(B)

IMAGE FORMING SHEET, OPERATING APPARATUS, IMAGE FORMING APPARATUS WITHOUT TRANSPARENT ELECTRODE, AND IMAGE FORMING METHOD

BACKGROUND OF THE INVENTION

1. Field of the Invention

The present invention generally relates to an image forming sheet, an operating apparatus, an image forming apparatus, and an image forming method. More specifically, the present invention is directed to such an image forming sheet, an operating apparatus, an image forming apparatus, and an image forming method, capable of forming an image by applying either an electric filed or a magnetic field to an image forming layer, while no transparent electrode is used.

2. Description of the Related Art

Conventionally, the image forming apparatuses have been proposed in which the image forming sheets are detachably mounted on the drive apparatuses. These image forming sheets can be handled as "paper" (for example, Japanese Laid-open Patent Application Hei. 2-25440 and Japanese Laid-open Patent Application Hei. 4-355786).

This one conventional image forming apparatus, as represented in FIG. 9, is arranged as follows: That is, the liquid crystal panel 50A is detachably mounted on the drive apparatus 60 for selectively applying the voltages to the respective electrodes of this LCD panel 50A. The LCD panel 50A is equipped with the sheet-shape-arranged liquid crystal layer (not shown); a plurality of data electrodes positioned in the vicinity of one surface of this LCD layer, and in which a plurality of electrodes arranged along a preselected direction are arrayed in a preselected pitch (approximately 0.3 [mm]) along a direction perpendicular to the predetermined direction; and furthermore, a plurality of scanning electrodes positioned in the vicinity of the other surface of this LCD layer, and in which a plurality of electrodes arranged along a preselected direction are arrayed in a preselected pitch (approximately 0.3 [mm]) along a direction perpendicular to the predetermined direction.

To externally observe images formed in this conventional image forming apparatus, a high-cost transparent electrode must be employed so as to construct any one of the data electrode layer and the scanning electrode layer.

Also, in order to mount the LCD panel 50 on the drive apparatus 60, the respective electrode lines of the matrix electrode should be electrically Connected to the signal lines for the electrodes of the drive apparatus in a proper manner. However, as previously described, the pitch between the respective electrodes is set to approximately 0.3 [mm]. Under such a circumstance, it is practically difficult to correctly mount the LCD panel 50A on the drive apparatus 60 in order that the respective electrode lines of the matrix electrode are properly connected to the signal lines for the electrodes employed in the drive apparatus. As a result, such an image forming apparatus that the LCD panel 50A is detachably mounted on the drive apparatus 60 in the proper manner could constitute an ideal image forming apparatus. In other words, practically speaking, this image forming apparatus can be hardly realized.

Also, for example, another conventional image forming, apparatus has been described in U.S. Pat. No. 4,143,103 (Applicant: XEROX corporation). As indicated in FIG. 10, in this image forming apparatus, the image forming sheet 5OB is detachably mounted on the drive apparatus (not shown). This image forming sheet 50B is constituted by the image forming layer 52 for rotatably storing a plurality of 2-color rotating member particles (not shown) into a sheet-shaped elastomer. These 2-color rotating member particles are painted in two colors, and the respective surface charges of these colors are different from each other. This image forming apparatus is further arranged by the data electrode layer 54 arranged on one side of this image forming apparatus 52; the scanning electrode layer 56 arranged on the other side of this image forming apparatus 52; and one pair of boards 59 and 60 for sandwiching these image forming apparatus 52, data electrode layer 54, and the scanning electrode layer 56. It should be understood that in this image forming layer 52 of the image forming apparatus (see FIG. 10), the surface resistances of the visible side surface and another side surface located opposite to this visible side surface are made equal to each other and also made large.

Similarly, in order to externally observe the image, any one of the visible sides of the data electrode layer 54 and the scanning electrode 56 must be made of the expensive transparent electrode layer. Alternatively, the image may be formed without such a transparent electrode layer. In this alternative case, the image forming condition cannot be confirmed. In other words, no confirmation can be made of the image unless the image is written into the image forming sheet 50B, and this image forming sheet 50B is derived from any one of the data electrode layer 54 and the scanning electrode layer 56. This alternative image forming method may simply have the same function as a simple printer. Therefore, this alternative image forming method cannot achieve the merit of the detachable image forming apparatus, namely, the image forming sheet can be handled as paper.

On the other hand, the above-described drawback can be solved by such an image forming technique as disclosed in Japanese Laid-open Patent Application Hei. 6-35370, which is capable of hardly the image forming sheet. This conventional image forming technique is to form the image on the electrophoresis image forming display sheet, while the electrostatic latent image is formed on the photosensitive member and the image is formed based on this electrostatic latent image. The protection plate having the transparent electrode layer is provided on the electrophoresis image display sheet on which the image is formed. In accordance with this prior art technique, the image forming sheet is made flexible, and therefore, this sheet can be handled as paper. However, in general, an easily-broken ITO is used as this transparent electrode. When this ITO image forming sheet is rounded, or roughly handled, this transparent electrode would be broken. Therefore, this transparent electrode must be made flexible. However, none of the conventional image forming techniques describes, or teaches this solution method.

SUMMARY OF THE INVENTION

The present invention has been made to solve the above-explained drawbacks, and therefore, has an object to provide an image forming sheet, an operating apparatus, an image forming apparatus equipped with these image forming sheet and operating apparatus, and also, as image forming method, capable of confirming an image without employing a transparent electrode.

To achieve the above-described object, an image forming sheet, according to an aspect of the present invention, is featured by comprising a sheet-shaped image forming layer for forming thereon a visible image by being applied by any one of an electric field and a magnetic field and a pair of flexible films for supporting the image forming layer from both surface sides thereof without having an electrode, one of an electric resistance and a magnetic resistance of one flexible film being smaller than that of the other flexible film.

In this case, the image forming layer forms such a color image in response to the applied direction of the electric field, or the magnetic field. It should be noted that at least one of the paired films is made transparent.

Also, an operating apparatus, according to another aspect of the present invention, is featured by that either the electric field or the magnetic field is applied to the image forming sheet from the other film surface side in order to form the image thereon in response to the image data.

Then, an image forming apparatus, according to another aspect of the present invention, is featured by employing the above-explained image forming sheet and the above-described operating apparatus. It should be noted that the image forming sheet and the operating apparatus are detachably mounted.

Also, to form an image, a sheet-shaped image forming layer for forming a visible image thereon by being applied by one of an electric field and a magnetic field is supported from both side surfaces thereof by one pair of flexible films having no electrode, one of an electric resistance and a magnetic resistance of one flexible film being smaller than that of the other flexible film; and one of the electric field and the magnetic field is applied to both the image forming layer and the one pair of films from the other film side so as to form an image in response to image data.

As previously explained in detail, since the operating apparatus used to form the image may apply either the electric field or the magnetic field to the image forming sheet, the image forming sheet is no longer required to have such a high-cost transparent electrode.

Also, since only the portion within the image forming sheet may constitute the image forming region, to which either the electric field or the magnetic field is applied, the image forming sheet can be very easily mounted on the operating apparatus. In addition, the image forming sheet of the present invention is not so arranged that the image forming layer is sandwiched by the data electrode layer and the scanning electrode layer, but is simply arranged in such a manner that the operating apparatus may apply either the electric field or the magnetic filed to the image forming sheet so as to form the desirable image. This image forming sheet is equipped with one pair of flexible films which do not own the image forming layer and also the electrode capable of supporting this image forming layer from both side surfaces thereof. It should be understood that since one pair of flexible films without having the electrode are employed, there is no line interrupt problem.

On the other hand, each of the above-explained one paired films may contain a first area portion for supporting an overall area of the image forming layer from both aide surfaces thereof; and a second area portion arranged around the first area portion. The image forming sheet is further comprised of: a member having the same characteristic (e.g., same electric capacitance, same magnetic capacitance) as that of the image forming layer, which is arranged between the second area portions of the one pair of films and also is supported by the second area portions.

The operating apparatus may be comprised of a first operating portion for applying one of the electric field and the magnetic field in response to the image data and a second operating portion arranged around the first operating portion and for applying one of the electric filed and the magnetic filed irrespective of the image data.

That is to say, the image forming sheet is arranged on the operating apparatus in such a manner that the first area portion corresponds to the first operating portion, and furthermore, the second area portion corresponds to the second operating portion.

Now, when the operating apparatus is equipped with only the first operating portion, in such a case that the entire first operating portion applies the magnetic field or the electric field having the same strengths so as to form the same colored image over the entire image forming layer, each of one-paired films is charged, or magnetized by the same degree, but either the electric field or the magnetic field can not be applied to the image forming layer. That is, it is not possible to form the same-colored image over the entire area of this image forming layer.

However, as explained above, when the operating apparatus is equipped with the first operating portion and the second operating portion, even when the entire portion of the first operating portion may apply the electric field or the magnetic field having the same degrees, the respective one-paired films are influenced by the electric field or the magnetic field from the second operating portion. As a result, since the first area portion and the second area portion of the other film are charged, or magnetized with different degrees, the same colored image can be formed over the entire image forming layer. The above explanation is also true in the case where a predetermined-colored image is formed on most of the image forming layer and a different color is applied only on small portion of the layer.

In this case, as previously explained, when such a member having the same characteristic (for example, same electric capacitance, or same magnetic capacitance) as that of the image forming layer is arranged between the second area portions of one-paired films located at the position corresponding to the second operating portion, either the electric field or the magnetic field can be readily applied to the image forming layer.

Alternatively, the following image forming sheet may be applied instead of the above-explained image forming sheet. That is, this alternative image forming sheet is featured by comprising: a sheet-shaped image forming layer for forming thereon a visible image by being applied by any one of an electric field and a magnetic field; and sheet-shaped supporting means for supporting the image forming layer from both surface sides thereof, one of an electric resistance and a magnetic resistance of a first viewed surface of the sheet-shaped supporting means being smaller than that of a second viewed surface positioned opposite to the first viewed surface.

BRIEF DESCRIPTION OF THE DRAWINGS

For a better understanding of the present invention, reference is made of a detailed description to be read in conjunction with the accompanying drawings, in which:

FIG. 3A and FIG. 3B illustratively represent a detailed structure of the image forming sheet shown in FIG. 1;

FIG. 4 illustratively indicates a detailed structure of the operating apparatus shown in FIG. 2;

FIG. 5A and FIG. 5B illustratively show conditions under which the electric field is applied to 2-color rotating member particles;

FIG. 6A and FIG. 6B are illustrations for representing such a condition that the image forming sheet is mounted on the operating apparatus so as to form an image in accordance with the first embodiment;

DESCRIPTION OF THE PREFERRED EMBODIMENTS

Referring now to drawings, various preferred embodiments of the present invention will be described.
Structures of First Image Forming Sheet/Operating Apparatus/Image Forming Apparatus Now, a detailed description is made of an image forming apparatus according to a first embodiment of the present invention. It should be noted that this image forming apparatus of the first embodiment corresponds to an electrophoresis type image forming apparatus.

Figure 1:
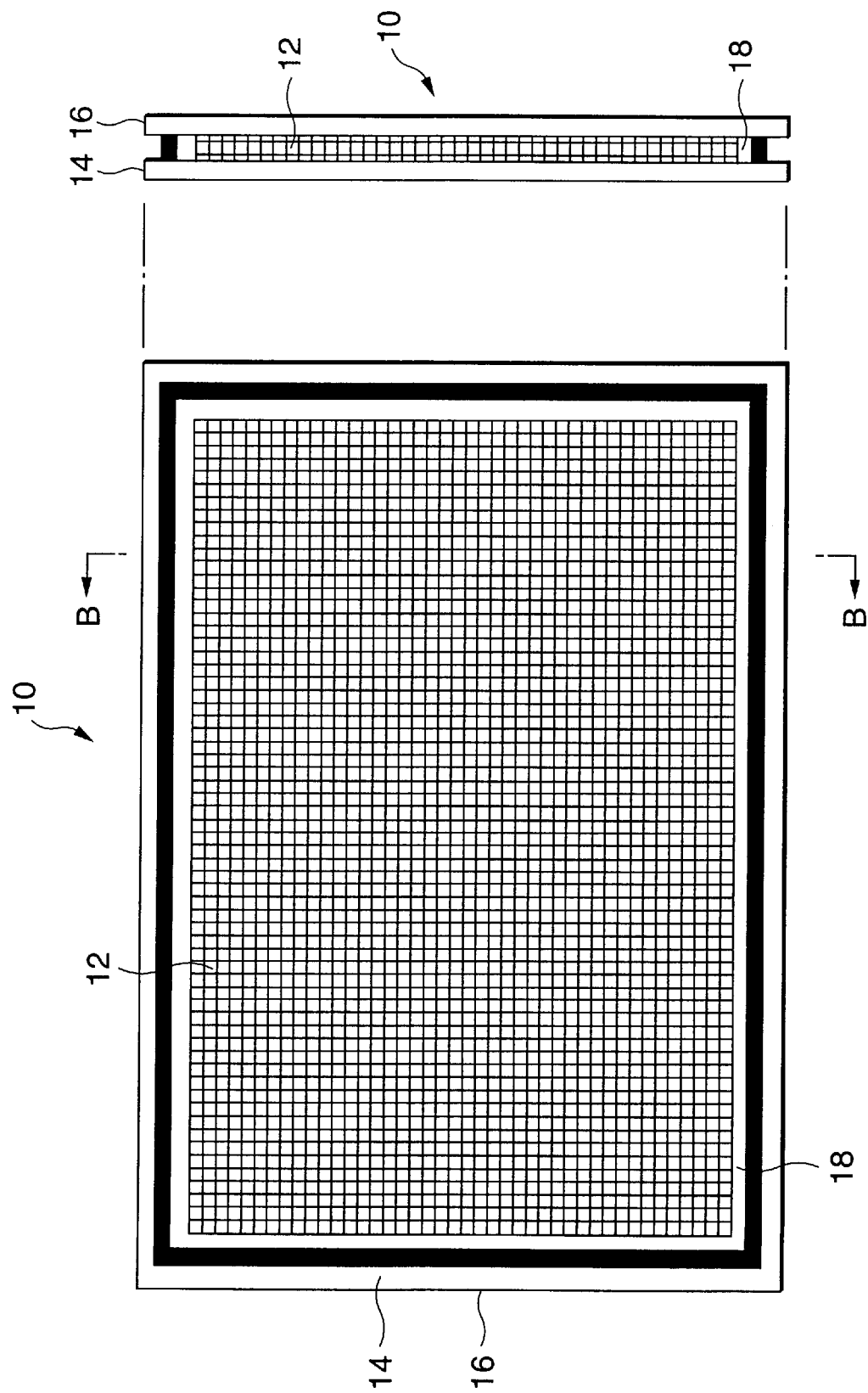
FIG. 1A and FIG. 1B illustratively show an image forming sheet according to a first embodiment of the present invention.

As illustratively shown in FIG. 1A and FIG. 1B, an image forming sheet 10, according to the first embodiment, is constituted by an image forming layer 12, a film-shaped material 14, and another film-shaped material 16. When an electric field is applied to the image forming layer 12, this image forming layer 12 forms thereon a visible image. The film-shaped material 14 is arranged in the vicinity of the image forming layer 12, and this sheet-shaped material 14 owns a small surface resistance and also a flexibility characteristic. The film-shaped material 16 is arranged in the vicinity of such a surface of the image forming layer 12, which is located opposite to another film-shaped material 14, and this film-shaped material 16 owns a large surface resistance, and also a flexibility characteristic. It should be understood that both the film-shaped material 14 and the film-shaped material 16 sandwich the image forming layer 12 between them, and furthermore, are adhered to this image forming layer 12 by using an adhesive agent 18. As a result, both the film-shaped material 14 and the film-shaped material 16 may support the image forming layer 12 from both sides thereof. It should also be noted that the film-shaped material 14 is made transparent.

Figure 2:
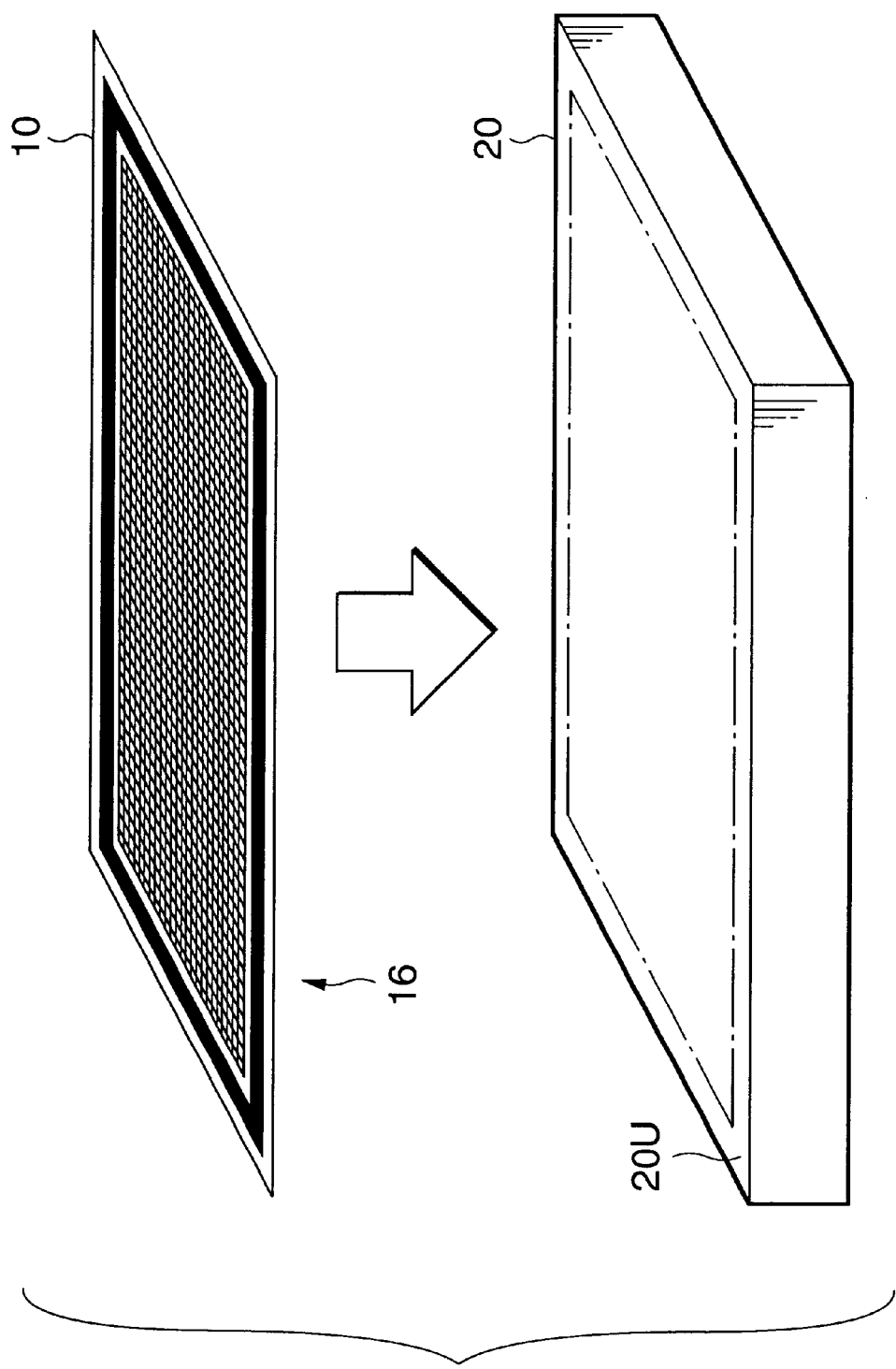
FIG. 2 is a perspective view for schematically indicating an image forming apparatus according to the first embodiment of the present invention.

As represented in FIG. 2, an operating apparatus 20, according to this first embodiment, applies an electric field to the above-explained image forming sheet 10. It should further be noted that this image forming sheet 10 is mounted on the operating apparatus 20 in such a manner that the film-shaped material 16 having the large surface resistance is made in contact with an upper surface 20U of this image forming sheet 10.

Then, the structures of the image forming sheet/apparatus according to the first embodiment will now be described more in detail.

As indicated in FIG. 3, the image forming layer 12 of the image forming sheet 10 (adhesive layer 18 being omitted) is constructed of an elastomer 15 having a thickness "L2", for example, 150 [$\mu$m]. A plurality of cavities 34 are arranged in a sheet shape in this elastomer 15. These plural cavities 34 rotatably store thereinto 2-color rotating member particles 32 having diameters L0, for example, 100 [$\mu$m]. As to this 2-color rotating member particle 32, one semi-spherical plane thereof is painted in white, whereas the other semi-spherical plane thereof is painted in black. Furthermore, the white semi-spherical plane of this 2-color rotating member particle 32 is charged at the negative potential, whereas the black semi-spherical plane thereof is charged at the positive potential. It should also be noted that the cavities 34 are filled with fluids which are formed in order that the 2-dolor rotating member particles 32 can be freely moved.

Also, the film-shaped material 14 has a thickness "$L_1$" (for example, 100 [$\mu$m]), and the film-shaped material 16 owns a thickness "$L_3$" (for instance, 100 [$\mu$m]). The surface resistance of the film-shaped material 14 is selected to be $10^{11}$ [$\Omega/cm^2$] per unit area, whereas the surface resistance of the film-shaped material 16 is selected to be $10^{18}$ [$\Omega/cm^2$] per unit area.

As illustrated in FIG. 4, the operating apparatus 20 is provided with a board 36, an electric-shocking-proof insulating film 38, and a selection switch (not shown in detail). This board 36 is equipped with a plurality of electrodes 22 arranged in a matrix shape and separated from each other with respect to each of pixels. This board 36 is arranged on the side of the upper surface 20U. This insulating film 38 is arranged on the board 36 (electrodes 22). In response to image data, this selection switch selectively applies voltages to the respective electrodes.

Image Forming Operations of First Image Forming Sheet/Apparatus

Next image forming operations of the above-explained image forming sheet 10 and image forming apparatus 20, according to the first embodiment, will now be described.

While the image forming layer 12 is supported by the film-shaped material 14 and the film-shaped material 16 from both surface sides, the image forming sheet 10 equipped with this image forming layer 12 is mounted on the operating apparatus 20 in such a manner that the film-shaped material 16 having the large surface resistance is made in contact with the upper surface 20U. The operating apparatus 20 selectively applies voltages to a plurality of electrodes 22 by operating the selection switch in response to the image data. Alternatively, the image forming sheet 10 may be mounted on the operating apparatus 20 for selectively applying the voltages to the plural electrodes 22 in response to the image data in such a manner that the film-shaped material 16 having the small surface resistance is made in contact with the upper surface 20U.

As illustratively shown in FIG. 5, voltages are selectively applied to the electrode 22 (namely, an electrode 22A used to form a white image, and another electrode 22B used to form a black image). For example, a voltage of 40 [V] is applied to one electrode 22A, and another voltage of 0 [V] is applied to the other electrode 22B. In this first embodiment, since the film-shaped material 16 owns the large surface resistance, movement of electrons is constrained. As a result, potentials at an area 16A and another area 16B, corresponding to the electrodes 22A and 22B of the film-shaped material 16, are 40 [V] and 0 [V], respectively.

On the other hand, since the surface resistance of the film-shaped material 14 is smaller than that of another film-shaped material 16, the electrons are freely moved. As a consequence, the surface of this film-shaped material 14 becomes equal potentials, namely 20 [V].

As a result, such an electric field (40[V]→20[V]) along a direction "A" directed from the electrode 22A toward the film-shaped material 14 is applied to the 2-color rotating member particles 34 located in the area corresponding to the electrode 22A within the image forming sheet 10. In contrast, another electric field (20[V]→0[V]) along another direction "B" directed from the film-shaped material 14 toward the electrode 22B is applied to the 2-color rotating member particles 34 located in the area corresponding to the electrode 22B within the image forming sheet 10.

As previously explained, a 2-color rotating member particle 32 is charged in such a manner that a white semi-spherical plane thereof is charged at a negative potential whereas a black semi-spherical plane thereof is charged at a positive potential, As a consequence, the white semi-spherical plane of the 2-color rotating member particle 34 located in the area corresponding to the electrode 22A provided within the image forming sheet 10 is directed to the material side (visible side) of the film-shaped material 14, whereas the black semi-spherical plane of the 2-color rotating member particle 34 located in the area corresponding to the electrode 22B provided in the image forming sheet 10 is directed to the side (visible side) of the film-Shaped material 14.

As a consequence, when the image forming sheet 10 (see FIG. 6A) is mounted on the operating apparatus 20 and the voltages are selectively applied to the plural electrodes 22 in response to the image data, or when the image forming sheet 10 is mounted on such an operating apparatus 20 for selectively applying the voltages to the plural electrodes 22 in response to the image data (see FIG. 6A and FIG. 6B), a black/white image corresponding to the image data is formed on the image forming sheet 10, as represented in FIG. 6A. On the other hand, as described above, since the film-shaped material 14 is made transparent, the formed black/white image can be observed via the film-shaped material 14. Alternatively, while another film-shaped material 16 is made transparent, an image may be observed via this film-shaped material 16. Furthermore, while both the film-shaped materials 14 and 16 are made transparent, images may be observed via both these film-shaped materials 14 and 16. In this alternative case, the images which are observed via both these film-shaped materials 14 and 16 constitute two black/white-inverted images.

It should also be noted that the larger the difference between the voltage applied to the electrode 22A and the voltage applied to the electrode 22B becomes, and either the smaller the surface resistance of the film-shaped material 14 becomes or the larger the surface resistance of the film-shaped material 16 becomes, the magnitude of the electric field applied to the two-color rotating member particles can be increased. As a result, sharp images can be formed.

Figure 7B:
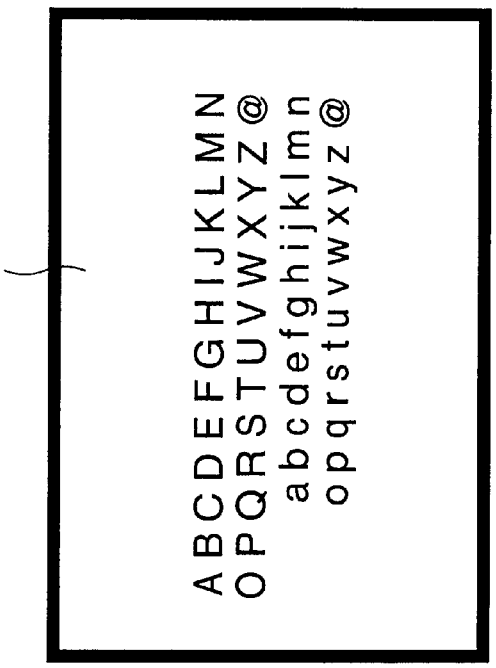
FIG. 7A and FIG. 7B are illustrations for showing such a condition that the image forming sheet has been released from the operating apparatus in accordance with the first embodiment.
Figure 7A:
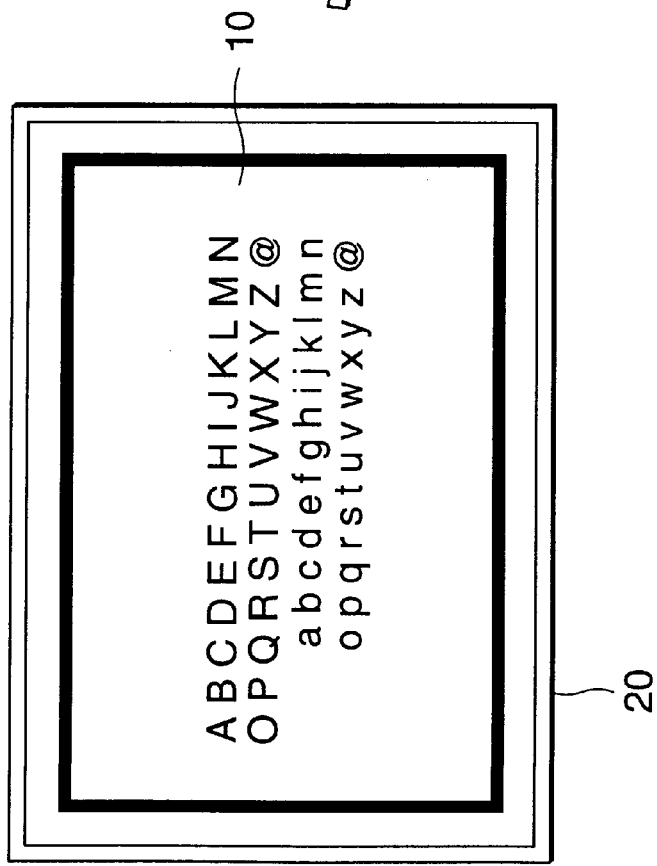

On the other hand, in the image forming layer 12, the 2-color rotating member particles 32 are rotatably stored in the cavities 34 filled with a preselected fluid. Based upon the resistance executed the inner wall of the cavity 34 and the 2-color rotating member particle 32, this 2-color rotating member particle 32 may keep the present direction thereof within the cavity 34. When an electric field is applied to this 2-color rotating member particle 32, this 2-color rotating member particle 32 is rotated along a direction corresponding to the applied electric field. As a result, when an image is once formed on the image forming layer 12 (see FIG. 7A), even when this image forming layer 12 is released, or detached from the operating apparatus 20, the image formed thereon is maintained by presence of the above-described resistance (see FIG. 7B). As a result, the image forming sheet 10 can be solely handled as a transaction.

Figure 8:
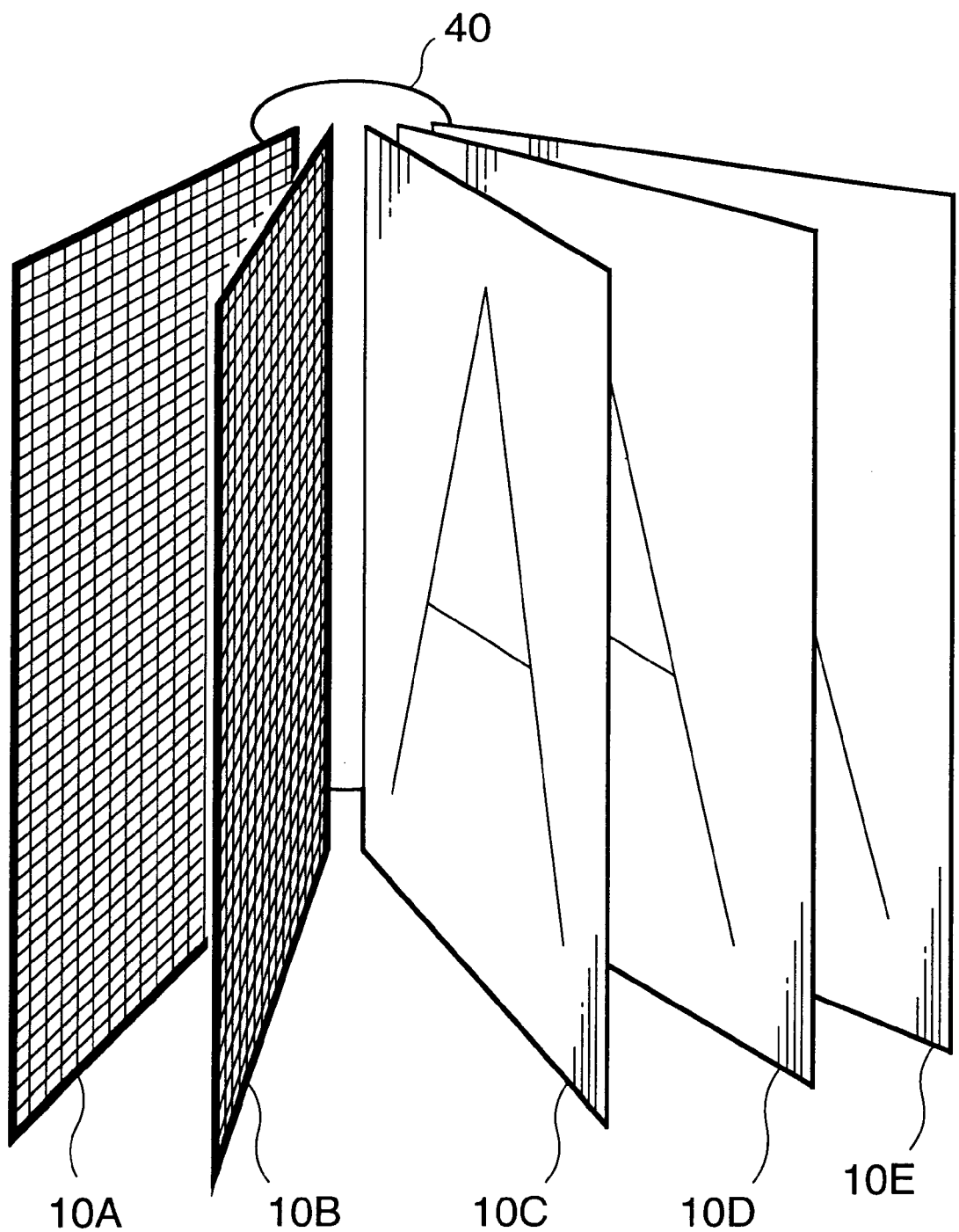
FIG. 8 illustratively shows such a condition that a plurality of image forming sheets according to the first embodiment are overlapped.

Therefore, as shown in FIG. 8, a plurality of image forming sheets 10A, 10B, 10C, 10D, and 10E, on which the respective images are formed, and also which are released from the operating apparatus 20 may be bound by employing a binder 40 and the like so as to be utilized.

Comparison with Conventional Image Forming Techniques

Figure 9:
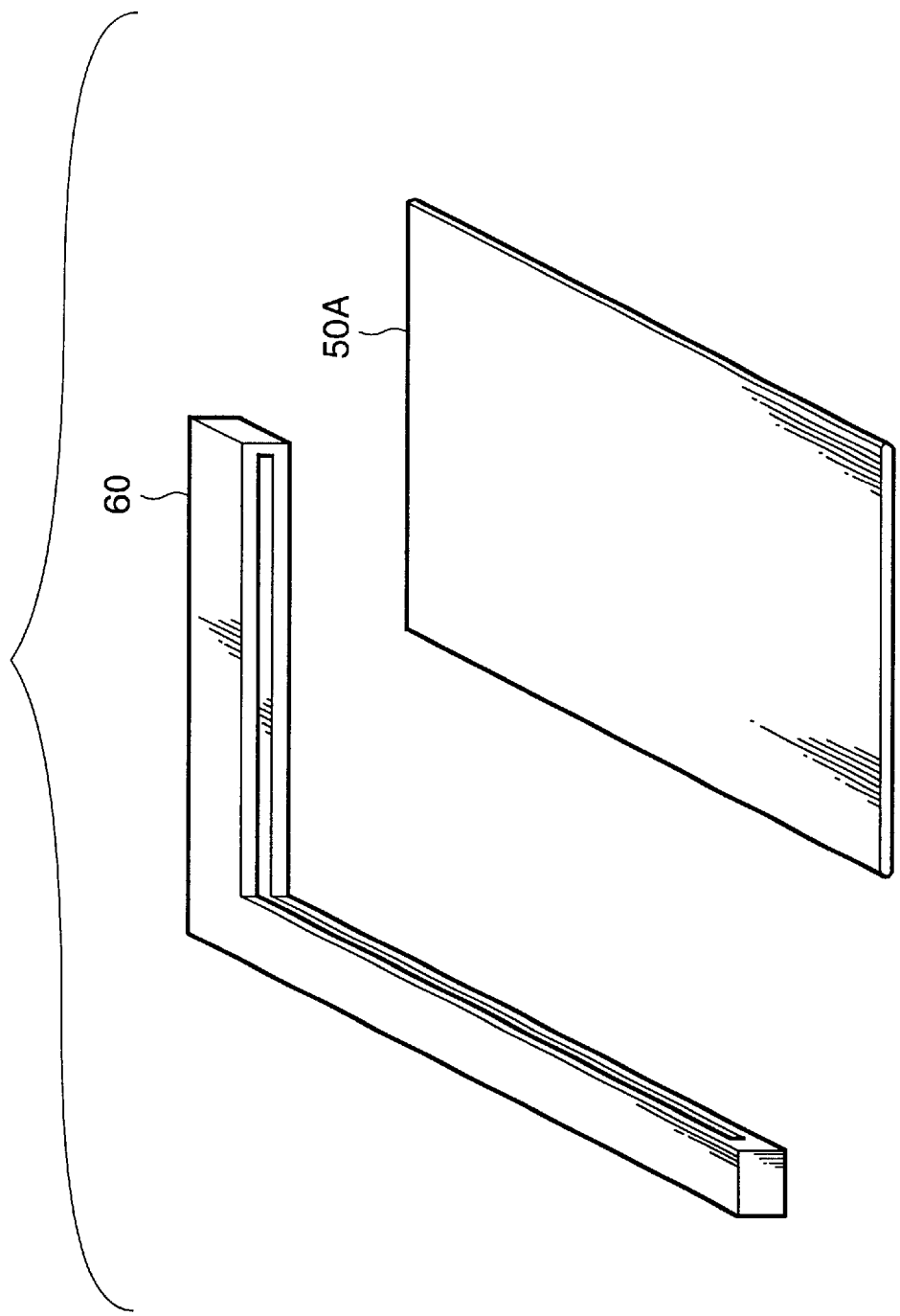
FIG. 9 is a perspective view for indicating the conventional image forming apparatus in which the liquid crystal display panel is detachably mounted on the drive apparatus.
Figure 10:
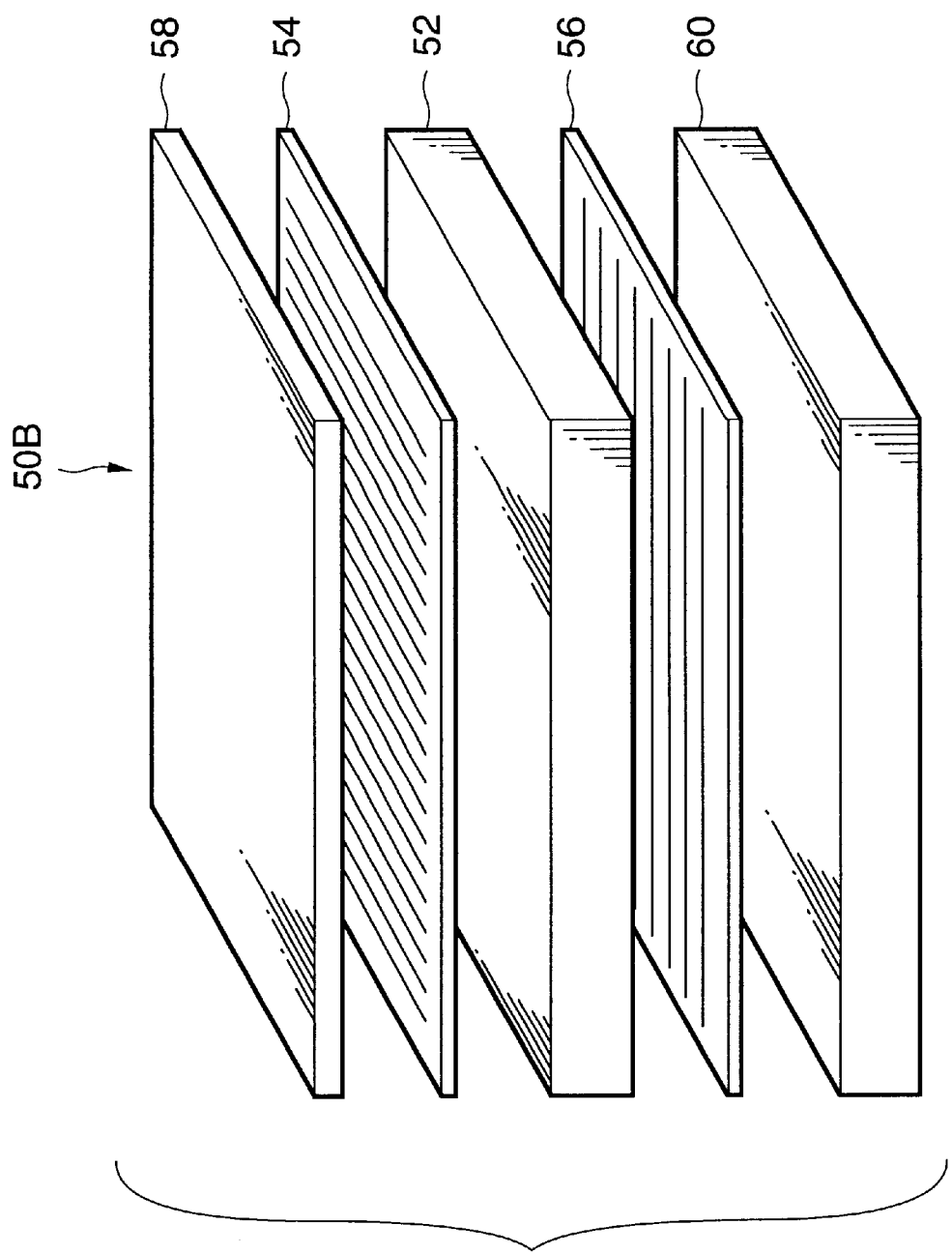
FIG. 10 is a perspective view for indicating the conventional image forming apparatus in which the image forming sheet is detachably mounted on the drive apparatus, and this image forming sheet is constituted by storing the 2-color rotating member particles in the sheet shape.

On the other hand, in the above-explained conventional image forming techniques, the liquid crystal display (LCD) panel 50A (see FIG. 9) and the image forming sheet 50B (see FIG. 10) are equipped with the data electrode layer and the scanning electrode layer, which are arranged so as to sandwich the LCD layer and the image forming layer. While the voltages are applied to both the data electrode and the scanning electrode in order to produce the electric field, the desirable image is formed. In particular, since the strong electric field is required in the LCD panel 50A so as to form the image, both the data electrode layer and the scanning electrode layer must be positioned in the vicinity of the LCD layer. Also, since the visual side surface and the surface resistance of this visual side surface have the same values and also own the large values, the image cannot be formed unless such a structure is employed that the image forming layer 52 (see FIG. 10) is sandwiched by the data electrode layer and the scanning electrode layer.

To the contrary, in accordance with this first embodiment, the image forming sheet is constituted in such a manner that the image forming layer is sandwiched by one pair of sheet-shaped materials, in which the electric resistance of the visual side surface is smaller than that of the plane located opposite to this visual side surface. Also, the image forming sheet 10 is not equipped with any electrode. Instead, while the electrode is provided on the upper surface 20U of the operating apparatus 20, since the voltage is applied to this electrode, the electric field is produced between one pair of sheet-shaped materials and also is applied to the image forming layer.

As previously described, since the prior art structure is made by sandwiching both the LCD layer and the image forming layer by employing the data electrode layer and the scanning electrode layer, when the image display unit is detachably mounted on the drive apparatus, this detachable structure would become complex. To the contrary, in accordance with this first embodiment, the following structure is employed. That is, the image forming sheet is constituted in such a manner that the image forming layer is sandwiched by one pair of sheet-shaped materials, in which the electric resistance of the visual side surface is smaller than that of the plane located opposite to this visual side surface. As a result, this image forming structure can be made simple.

Also, in the prior art, the LCD panel 50A and the image forming sheet 50B must be mounted on the drive apparatus in such a manner that the respective electrode lines of the matrix electrode layer are connected to the signal lines corresponding to the electrodes of the operating apparatus. As a result, such amounting operation can be hardly carried out. To the contrary, in accordance with this first embodiment, when the image forming sheet 10 is mounted on the operating apparatus 20 in such a manner that the film-shaped material 16 having the large surface resistance is made in contact with the upper surface 20U, the region located in such an area corresponding to the electrode of the image forming sheet 10 may constitute the image forming region. Therefore, the sheet mounting operation can be very easily carried out. It should be understood that when the image forming sheet 10 is mounted on the operating apparatus 20 in such a manner that the film-shaped material 14 having the small surface resistance is made in contact with the upper surface 20U, since the above-described electric field is not produced, the 2-color rotating member particle 34 cannot be rotated. As a consequence, such a care must be sufficiently taken that the image forming sheet 10 is mounted on the operating apparatus 20 in such a manner that the film-shaped material 16 having the large surface resistance is made in contact with the upper surface 20U.

Furthermore, in the prior art, any visual side of the data electrode layer and the scanning electrode layer must be made of the transparent electrode layer. To the contrary, in accordance with this first embodiment, since it is so arranged that the operating apparatus for forming the image may apply the electric field to the image forming sheet, no longer such an expensive transparent electrode is provided on the image forming sheet. As a consequence, the image forming apparatus and the image forming sheet can be manufactured in low cost. It should also be noted that since one pair of film-shaped materials are made of flexible structures having no electrode, there is no problem that the signal is interrupted.

Structures of Second Image Forming Sheet/ Operating Apparatus/Image Forming Apparatus A description will now be made of a second embodiment of the present invention.

In the case that an image is formed by the above-described image forming sheet of the first embodiment, as the basic structure thereof, the plane electrode is necessarily required similar to the prior art in order to form the entire surface in the same color, for example, in white, or black. This plane electrode is positioned opposite to the image writing electrode which is arranged over the one entire surface. As a result of a certain experiment, in order to form such an image having an area rate of a black area with respect to a white area (will be referred to as a "black rate" hereinafter) and also to form such an image having an area rate of a white area with respect to a black area (will be referred to as a "white rate" hereinafter), if the image writing operation must be carried out several times, then such an image having a sufficiently high contrast could not be formed. To the contrary, in accordance with this second embodiment, even when such an image whose entire area is white, or black is written; or either an image having a low black rate is written into a white image or either an image having a low white rate is written into a black image, such an image having a sufficiently high contrast can be formed.

Since the image forming structure according to the second embodiment is substantially same as that of the first embodiment, the same reference numerals used in the first embodiment will be employed as those for denoting the same, or similar structural elements of the second embodiment, and therefore, the descriptions thereof are omitted. Only different structural elements of the second embodiment will be explained.

Figure 11:
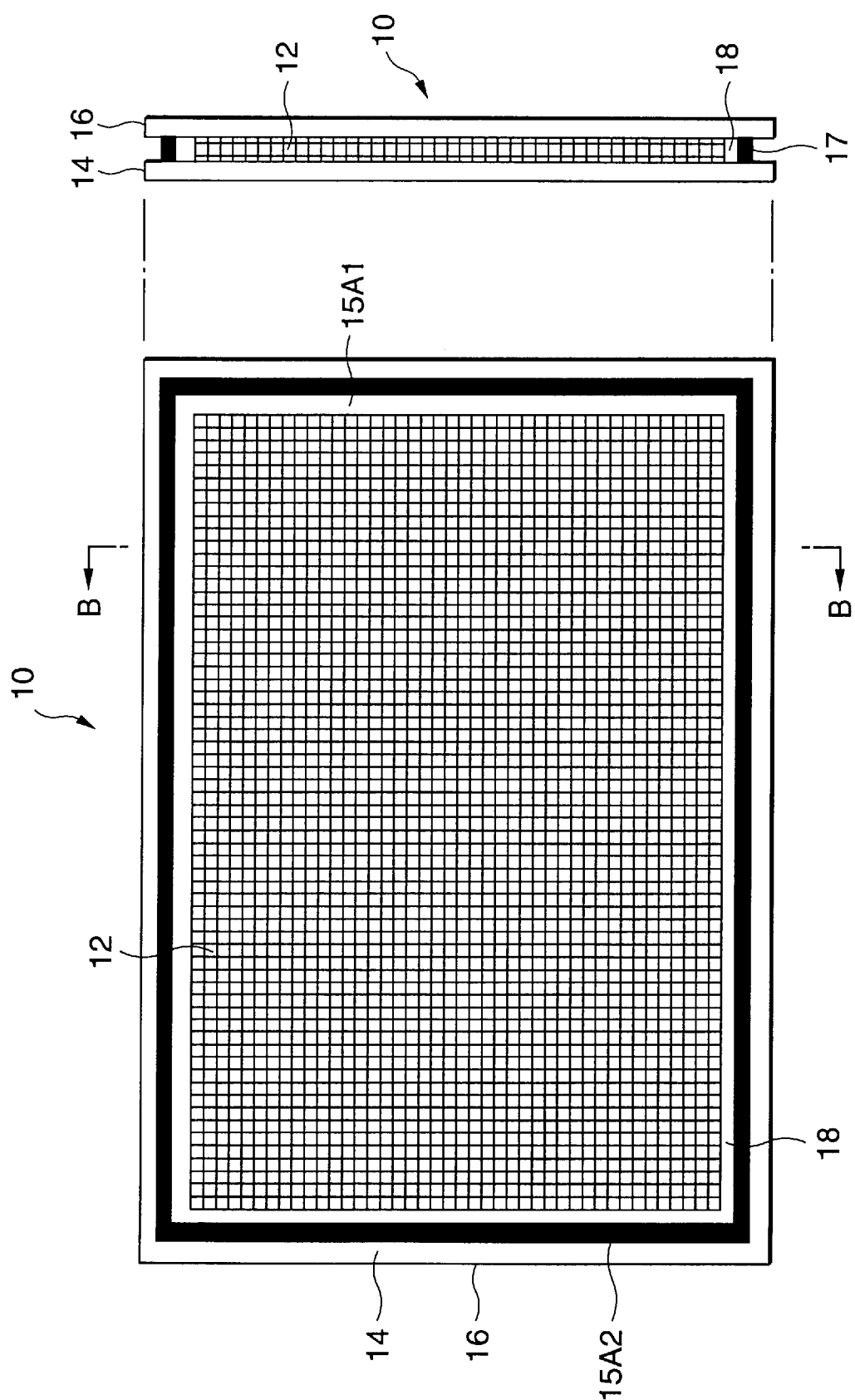
FIG. 11 illustratively shows an image forming sheet according to a second embodiment of the present invention.

As illustratively shown in FIG. 11, a pair of film-shaped materials 14 and 16, according to this second embodiments, are equipped with a first area portion 15A1 and a second area portion 15A2. The first area portion 15A1 supports an overall area of an image forming layer 12 from both surface side, The second area portion 15A2 is arranged around this first area portion 15A1.

A dummy capacitance portion 17, supported by the second area portion 15A2 from both side surfaces, is arranged between the second area portions 15A2 of one pair of film-shaped materials 14 and 16.

It should be noted that the electric capacitance of this dummy capacitance portion 17 is equal to the electric capacitance of the image forming layer 12.

Figure 12:
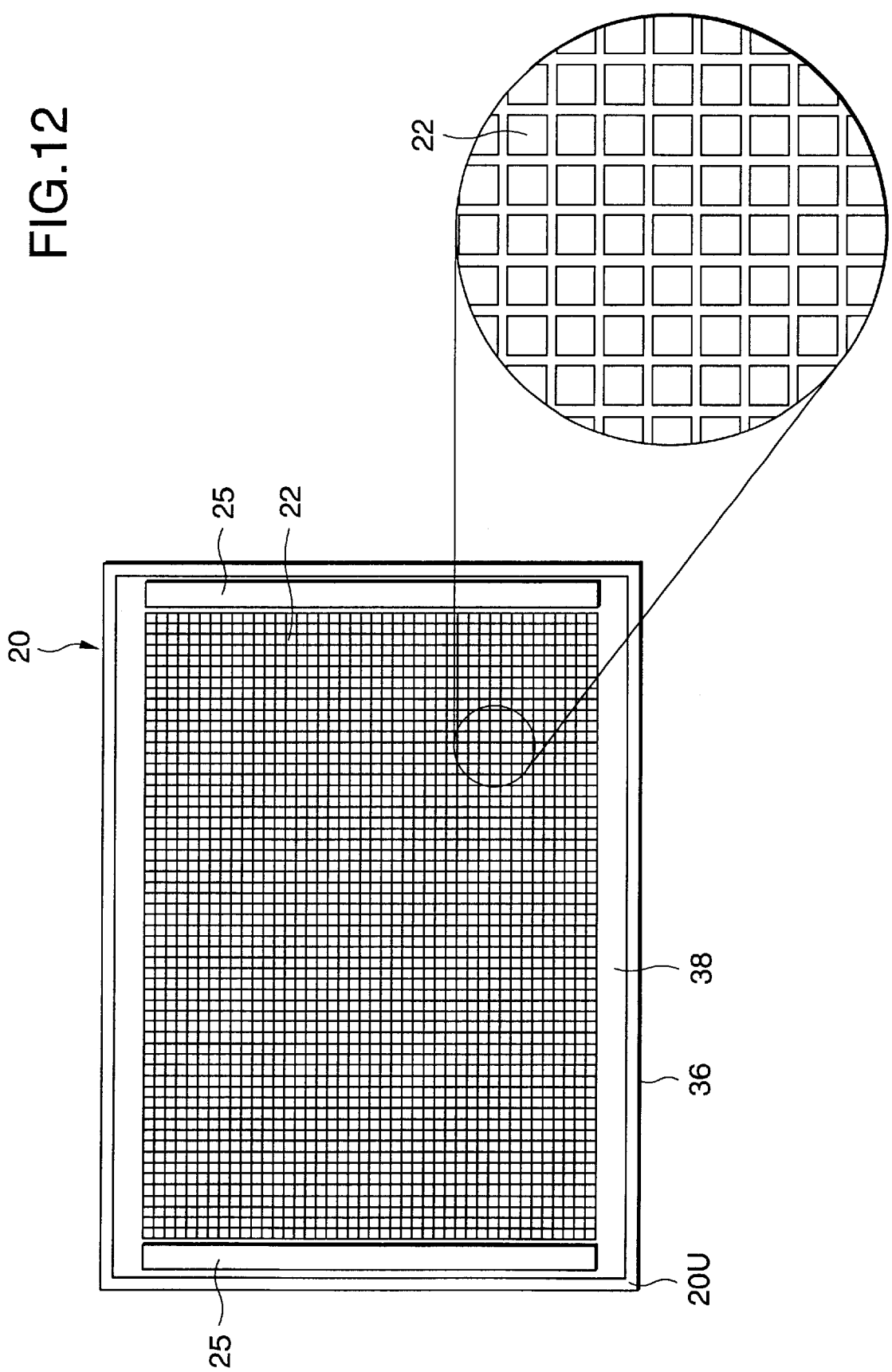
FIG. 12 illustratively indicates an operating apparatus according to the second embodiment.

As illustratively indicated in FIG. 12, an operating apparatus 20 is provided with a plurality of electrodes 22 (first operating portions) and a pair of dummy electrodes 25. These plural electrodes 22 may apply electric fields in response to image data. One pair of dummy electrodes 25 are arranged around such an area that these plural electrodes 22 are arranged, namely this area corresponds to right/left edge portions shown in FIG. 12. These paired dummy electrodes 25 may apply electric fields irrespective of image data.

Image Forming Operations of Second Image Forming Sheet/Apparatus

Next, a description will now be made of image forming operations by the image forming sheet/apparatus according to the second embodiment of the present invention.

First, operations of this second image forming apparatus when a white entire image is displayed will now be explained.

Figure 13:
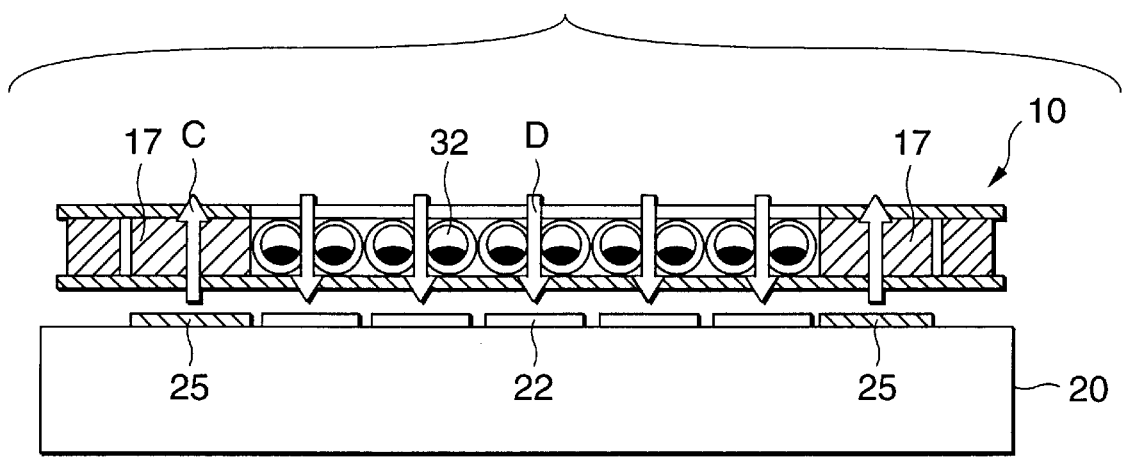
FIG. 13 illustratively represents such a condition that an image having a white entire surface is formed on the image forming layer of the image forming sheet according to the second embodiment.

FIG. 13 illustratively represents such a condition that a white image is formed on an overall upper surface of the image forming layer 12.

When the white image is formed on the entire surface, a negative voltage is applied to a plurality of electrodes 22. At this stage, a positive voltage having a polarity opposite to that of the negative polarity is applied to the dummy electrodes 25. Similar to the first embodiment, a portion of the film-shaped material 16 corresponding to a plurality of electrodes 22 is charged at a negative potential, a portion of the film-shaped material 16 corresponding to the dummy electrode 25 is charged at a positive potential, and the film-shaped material 14 is uniformly charged by the negative voltage applied to these plural electrodes 22 and also the positive voltage applied to the dummy electrodes 25. In other words, the film-shaped material 14 is charged by such a voltage which is higher than the negative voltages applied to the plural electrodes 22, and also lower than the positive voltage applied to the dummy electrode 25.

Figure 14:
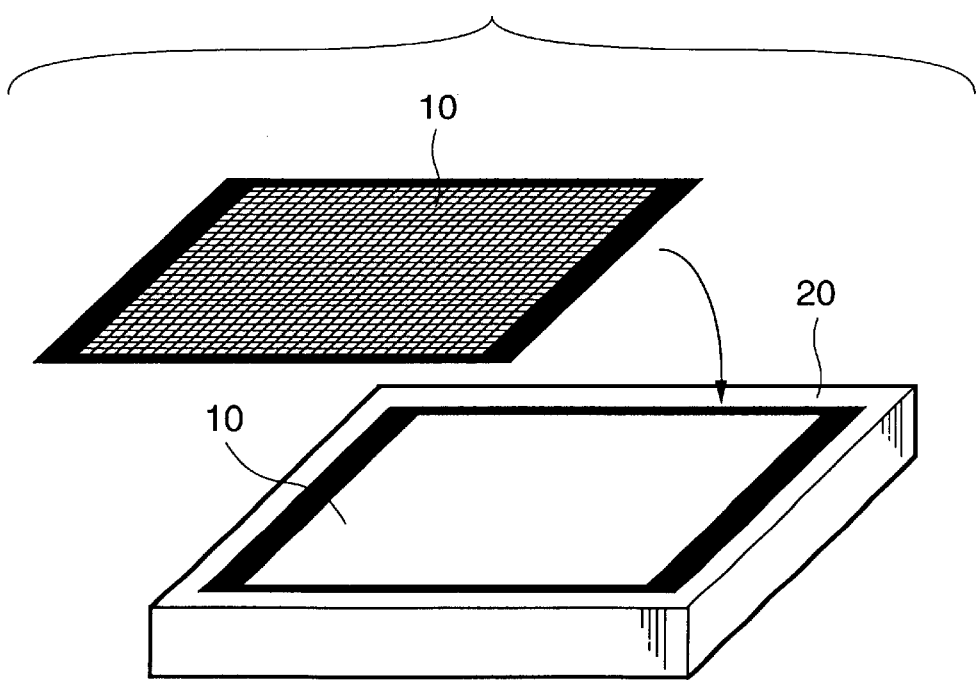
FIG. 14 illustratively indicates such a condition that while the image forming sheet of the second embodiment is set to the operating apparatus, an image having a white entire surface is formed on the image forming layer of the image forming sheet according to the second embodiment.

As a result, as indicated by an arrow "C", an up-directed electric field is applied to the dummy capacitance portion 17, whereas as indicated by an arrow "D", a down-directed electric field is applied to the upper surface of the image forming layer 12. As a consequence, the 2-color rotating member particle 32 located in the image forming layer 12 is rotated in such a way that "white" is directed to the upper surface, so that such as image whose entire surface is white is formed. This image forming condition is illustratively shown in FIG. 14. That is, as described above, when the image forming sheet 10 is mounted on the operating apparatus 20 for applying the voltage so as to give the electric field the overall upper surface of this image forming layer 12 is brought into a white state. Alternatively, after the image forming sheet 10 is mounted on the operating apparatus 20, this operating apparatus 20 may apply the voltage to thereby give the electric field, as previously explained.

Figure 15:
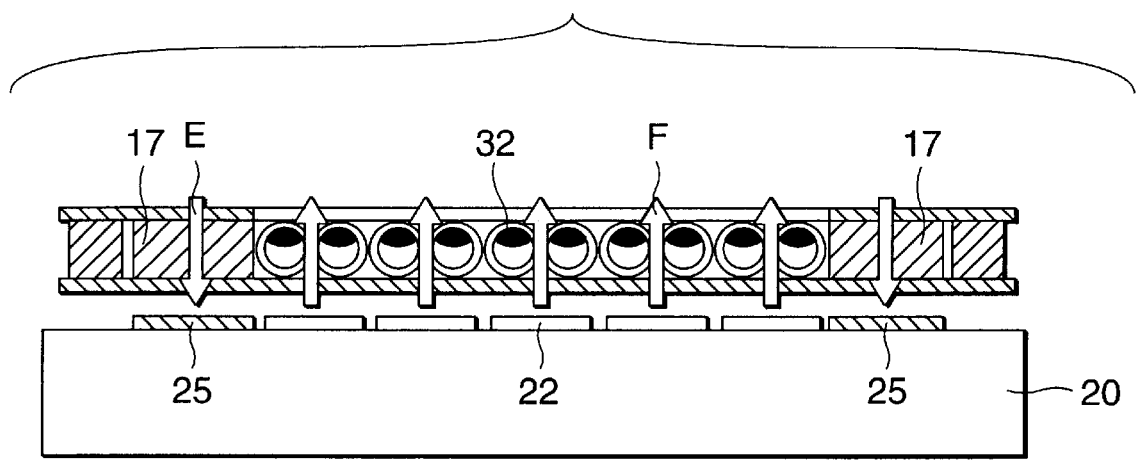
FIG. 15 illustratively represents such a condition that an image having a black entire surface is formed on the image forming layer of the image forming sheet according to the second embodiment.

Next, a description will now be made of image forming operations when such an image whose entire area is black is formed. FIG. 15 illustratively indicates such a condition that a black image is formed on an overall upper surface of the image forming layer 12.

Figure 16:
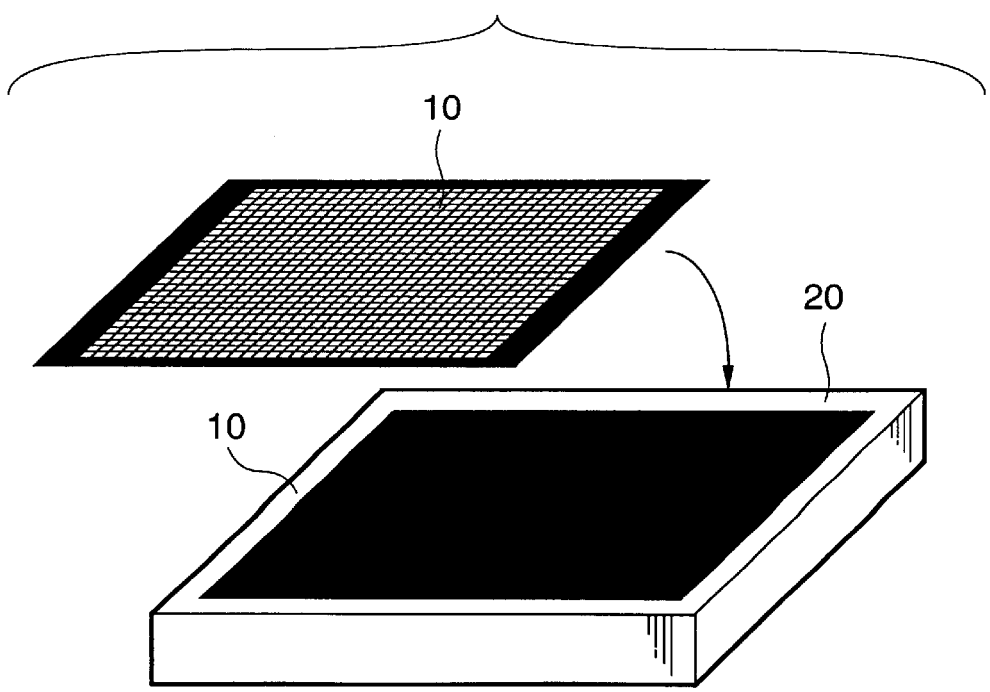
FIG. 16 Illustratively indicates such a condition that while the image forming sheet of the second embodiment is set to the operating apparatus, an image having a black entire surface is formed on the image forming layer of the image forming sheet according to the second embodiment.

When the black image is formed on the entire surface, a positive voltage is applied to a plurality of electrodes 22. At this stage, a negative voltage having a polarity opposite to that of the positive polarity is applied to the dummy electrodes 25. As a result, as indicated by an arrow "E", a down-directed electric field is applied to the dummy capacitance portion 17, whereas as indicated by an arrow "L", a down-directed electric field is applied to the image forming layer 12, As a consequence, the 2-color rotating member particle 32 located in the image forming layer 12 is rotated in such a way that "black" is directed to the upper surface, so that such an image whose entire surface is black is formed. This image forming condition is illustratively shown in FIG. 16. That is, as described above, when the image forming sheet 10 is mounted on the operating apparatus 20 for applying the voltage so as to give the electric field, the overall upper surface of this image forming layer 12 is brought into a black state. Alternatively, after the image forming sheet 10 is mounted on the operating apparatus 20, this operating apparatus 20 may apply the voltage to thereby give the electric field, as previously explained.

Figure 17:
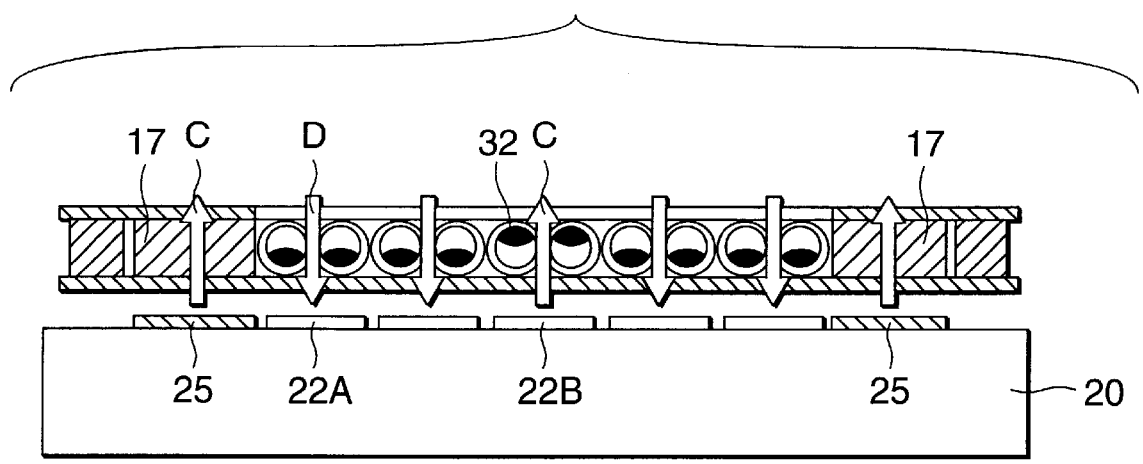
FIG. 17 illustratively represents such a condition that an image having a low black rate is formed.
Figure 18:
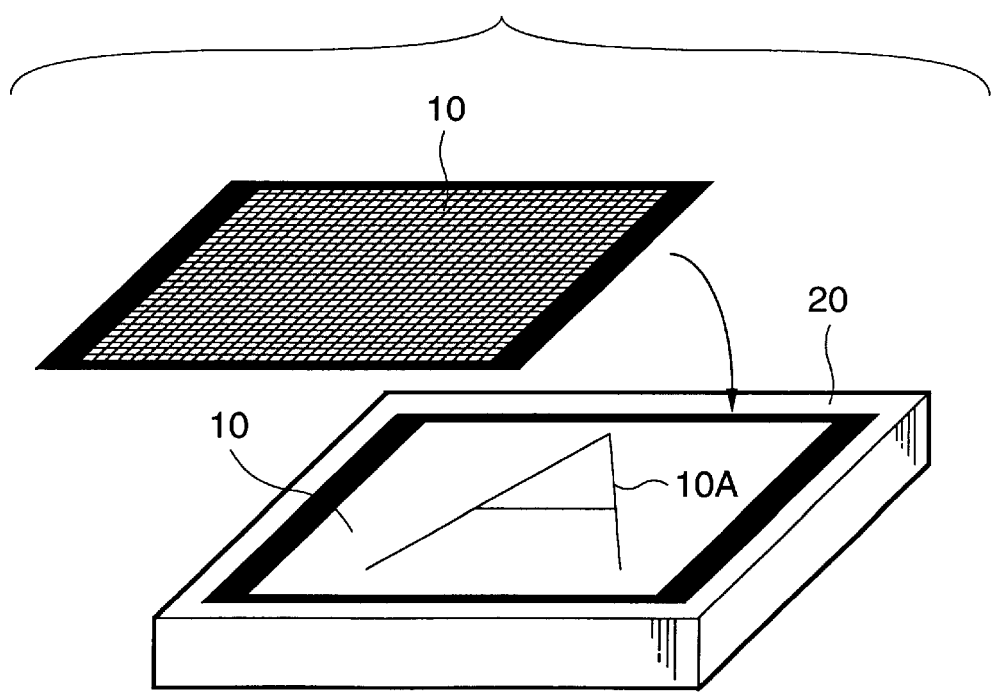
FIG. 18 illustratively shows such a condition that while the image forming sheet of the second embodiment is mounted on the operating apparatus, the image having the low black rate is formed on the upper surface of the image forming layer of this image forming sheet.

Subsequently, a description will now be made of image forming operations of the second image forming apparatus in such a case that a black image is slightly written into a white image. As illustratively shown in FIG. 17, a negative voltage is applied to an electrode 22A corresponding to a portion when a white image is formed, and a positive voltage is applied to another electrode 22B corresponding to another portion where a black image is formed. Then, a voltage having the same polarity as that of the above-described voltage used to write the black image is applied to the dummy electrodes 25. As a result, an up-directed electric field is applied to the dummy capacitance portion 17 along the electric field direction at the black image writing portion, namely equal to the arrow "C". Conversely, a down-directed electric field is applied to the white image writing portion along the direction as indicated by the arrow "D". As a consequence, only the 2-color rotating member particle 32 located at such a portion into which the black image is written in rotated under such a condition that the black semi-spherical plane thereof is directed along the up direction. FIG. 18 illustratively shows a condition of the image forming sheet in the case that the black image is slightly formed in the white image, While the image forming sheet 10 is mounted on the operating apparatus 20, the image having the black image slightly contained in the white image is formed. It should also be noted that after the image forming sheet 10 has been mounted on the operating apparatus 20, the electric field may be applied in the above-described manner.

Furthermore, when a white image is slightly written into a black image, a voltage having a polarity opposite to that of the above-described voltage may be applied.

As previously explained, in accordance with this second embodiment, such an image, the entire surface of which is white, or black, can be formed, and furthermore, another image having a low black rate, or a low white rate can be formed, although these images could not be formed by the image forming apparatus of the first embodiment.

As previously explained in the above embodiment, the electric field is utilized in order to charge the electrons on the surface of the 2-color rotating member particle and also to rotate this 2-color rotating member particle. However, the present invention is not limited thereto. Alternatively, for example, while at least a surface of a 2-color rotating member particle may be made of a magnetic material, a coil may be positioned at a rear surface of a color developing sheet in correspondence with each of pixels of an image forming area, and a direction of a current flowing through this coil may be changed to generate a magnetic field. Then, this magnetic filed may be used to rotate the 2-color rotating member particle (namely, electrophoresis type image forming method). In this alternative case, the magnetic capacitance of the dummy capacitance portion in the second embodiment is made equal to that of the image forming layer.

Furthermore, although the 2-color rotating member particles are employed in the above-explained embodiments, the present invention is not limited thereto. For example, a rotating member having a cylindrical shape may be employed. Moreover, alternatively, very fine particles may be used, for instance while a colored fluid is filled into a micro-capsule, white very fine particles may be used by way of the electrophoresis. Also, the present invention is not limited such an embodiment that the rotating member particle is divided into the above-described two color portions.

In addition, the 2-color rotating member particles are arranged in the sheet shape so as to construct the image forming sheet in the above-described embodiments, but the present invention is not limited thereto. Alternatively, while liquid crystal is arranged in a sheet condition in order to construct an image forming sheet, voltages may be selectively applied to electrodes in response to input image data in a manner similar to the above-described operating manner.

As previously explained in detail, since the operating apparatus used to form the image may apply either the electric field or the magnetic field to the image forming sheet, the present invention can own such an advantage that the image forming sheet is no longer required to have such a high-cost transparent electrode.

The present invention has another advantage that since only the portion within the image forming sheet may constitute the image forming region, to which either the electric field or the magnetic field is applied, the image forming sheet can be very easily mounted on the operating apparatus.

In addition, the present invention owns a further advantage as follows. The present invention is not so arranged that the image forming layer is sandwiched by the data electrode layer and the scanning electrode layer, but is simply arranged in such a manner that the operating apparatus may apply either the electric field or the magnetic filed to the image forming sheet so as to form the desirable image. This image forming sheet is equipped with one pair of flexible films which do not own the image forming layer and also the electrode capable of supporting this image forming layer from both side surfaces thereof.

What is claimed is:

1. An image forming sheet comprising:
    a sheet-shaped image forming layer for forming thereon a visible image by being applied by any one of an electric field and a magnetic field; and
    a pair of flexible films for supporting said image forming layer from both surface sides thereof without having an electrode, one of an electric resistance and a magnetic resistance of one flexible film being smaller than that of the other flexible film.

2. The image forming sheet as claimed in claim 1 wherein:
    at least one of said pair of films is made transparent.

3. An image forming sheet as claimed in claim 2 wherein:
    each of said pair of films includes:
        a first area portion for supporting an overall area of said image forming layer from both side surfaces thereof; and
        a second area portion arranged around said first area portion; and
    said image forming sheet is further comprised of:
        a member having the same characteristic as that of said image forming layer, which is arranged between said second area portions of said one pair of films and also is supported by said second area portions.

4. An image forming apparatus comprising:
    the image forming sheet as recited in claim 3; and
    an operating apparatus wherein:
        one of an electric field and a magnetic field is applied to the image forming sheet so as to form an image on said image forming sheet in response to image data.

5. The image forming apparatus as claimed in claim 4 wherein:
    both said image forming sheet and said operating apparatus are detachably mounted.

6. An image forming apparatus comprising:
    the image forming sheet as recited in claim 3; and
    an operating apparatus wherein:
        one of an electric field and a magnetic field is applied to the image forming sheet so as to form an image on said image forming sheet in response to image data;
        the operating apparatus comprising:
            a first operating portion for applying one of the electric field and the magnetic field in response to said image data; and
            a second portion arranged around said first operating portion and for applying one of the electric field and the magnetic field irrespective of said image data.

7. The image forming apparatus as claimed in claim 6 wherein:
    both said image forming sheet and said operating apparatus are detachably mounted.

8. An image forming apparatus comprising:
    the image forming sheet as recited in claim 2; and
    an operating apparatus wherein:
        one of an electric field and a magnetic field is applied to the image forming sheet so as to form an image on said image forming sheet in response to image data;
        the operating apparatus comprising:
            a first operating portion for applying one of the electric field and the magnetic field in response to said image data; and
            a second portion arranged around said first operating portion and for applying one of the electric field and the magnetic field irrespective of said image data.

9. The image forming apparatus as claimed in claim 8 wherein:
    both said image forming sheet and said operating apparatus are detachably mounted.

10. An image forming apparatus comprising:
    the image forming sheet as recited in claim 2; and
    an operating apparatus wherein:
        one of an electric field and a magnetic field is applied to the image forming sheet so as to form an image on said image forming sheet in response to image data.

11. The image forming apparatus as claimed in claim 10 wherein:
    both said image forming sheet and said operating apparatus are detachably mounted.

12. An image forming sheet as claimed in claim 1 wherein:
    each of said pair of films includes:
        a first area portion for supporting an overall area of said image forming layer from both aide surfaces thereof; and
        a second area portion arranged around said first area portion; and
    said image forming sheet is further comprised of:
        a member having the same characteristic as that of said image forming layer, which is arranged between said second area portions of said one pair of films and also is supported by said second area portions.

13. An image forming apparatus comprising:
    the image forming sheet as recited in claim 12; and
    an operating apparatus wherein:
        one of an electric field and a magnetic field is applied to the image forming sheet so as to form an image on said image forming sheet in response to image data.

14. The image forming apparatus as claimed in claim 13 wherein:
    both said image forming sheet and said operating apparatus are detachably mounted.

15. An image forming apparatus comprising:
    the image forming sheet as recited in claim 12; and
    an operating apparatus wherein:
        one of an electric field and a magnetic field is applied to the image forming sheet so as to form an image on said image forming sheet in response to image data;
        the operating apparatus comprising:
            a first operating portion for applying one of the electric field and the magnetic field in response to said image data; and a second portion arranged around said first operating portion and for applying one of the electric field and the magnetic field irrespective of said image data.

16. The image forming apparatus as claimed in claim 15 wherein:

both said image forming sheet and said operating apparatus are detachably mounted.

17. An operating apparatus wherein:

one of an electric field and a magnetic filed is applied to the image forming sheet as recited in claim 1 so as to form an image on said image forming sheet in response to image data.

18. The operating apparatus as claimed in claim 17 wherein:

said operating apparatus is comprised of:
 a first operating portion for applying one of the electric field and the magnetic field in response to said image data; and
 a second operating portion arranged around said first operating portion and for applying one of the electric filed and the magnetic filed irrespective of said image data.

19. An image forming apparatus comprising;

the image forming sheet as recited in claim 1; and an operating apparatus wherein:
 one of an electric field and a magnetic field is applied to the image forming sheet so as to form an image on said image forming sheet in response to image data.

20. The image forming apparatus as claimed in claim 19 wherein:

both said image forming sheet and said operating apparatus are detachably mounted.

21. An image forming apparatus comprising:

the image forming sheet as recited in claim 1; and an operating apparatus wherein:
 one of an electric field and a magnetic field is applied to the image forming sheet so as to form an image on said image forming sheet in response to image data;
 the operating apparatus comprising:
  a first operating portion for applying one of the electric field and the magnetic field in response to said image data; and
  a second portion arranged around said first operating portion and for applying one of the electric field and the magnetic field irrespective of said image data.

22. The image forming apparatus as claimed in claim 21 wherein:

both said image forming sheet and said operating apparatus are detachably mounted.

23. An image forming sheet comprising:

a sheet-shaped image forming layer for forming thereon a visible image by being applied by any one of an electric field and a magnetic field; and sheet-shaped supporting means for supporting said image forming layer from both surface sides thereof, one of an electric resistance and a magnetic resistance of a first viewed surface of said sheet-shaped supporting means being smaller than that of a second viewed surface positioned opposite to said first viewed surface.

24. An image forming apparatus comprising:

the image forming sheet as recited in claim 23; and an operating apparatus wherein:
 one of an electric field and a magnetic field is applied to the image forming sheet so as to form an image on said image forming sheet in response to image data.

25. The image forming apparatus as claimed in claim 24 wherein:

both said image forming sheet and said operating apparatus are detachably mounted.

26. An image forming apparatus comprising:

the image forming sheet as recited in claim 23; and an operating apparatus wherein:
 one of an electric field and a magnetic field is applied to the image forming sheet so as to form an image on said image forming sheet in response to image data;
 the operating apparatus comprising:
  a first operating portion for applying one of the electric field and the magnetic field in response to said image data; and
  a second portion arranged around said first operating portion and for applying one of the electric field and the magnetic field irrespective of said image data.

27. The image forming apparatus as claimed in claim 26 wherein:

both said image forming sheet and said operating apparatus are detachably mounted.

28. An image forming method wherein:

a sheet-shaped image forming layer for forming a visible image thereon by being applied by one of an electric field and a magnetic field is supported from both side surfaces thereof by one pair of flexible films having no electrode, one of an electric resistance and a magnetic resistance of one flexible film being smaller than that of the other flexible film; and one of the electric field and the magnetic field is applied to both said image forming layer and said one pair of films from the other film side so as to form an image in response to image data.

* * * * *